Aug. 12, 1941.            P. RENFREW            2,252,034
               VARIABLE RATIO TRANSMISSION MECHANISM
                    Filed Sept. 20, 1939         2 Sheets-Sheet 1
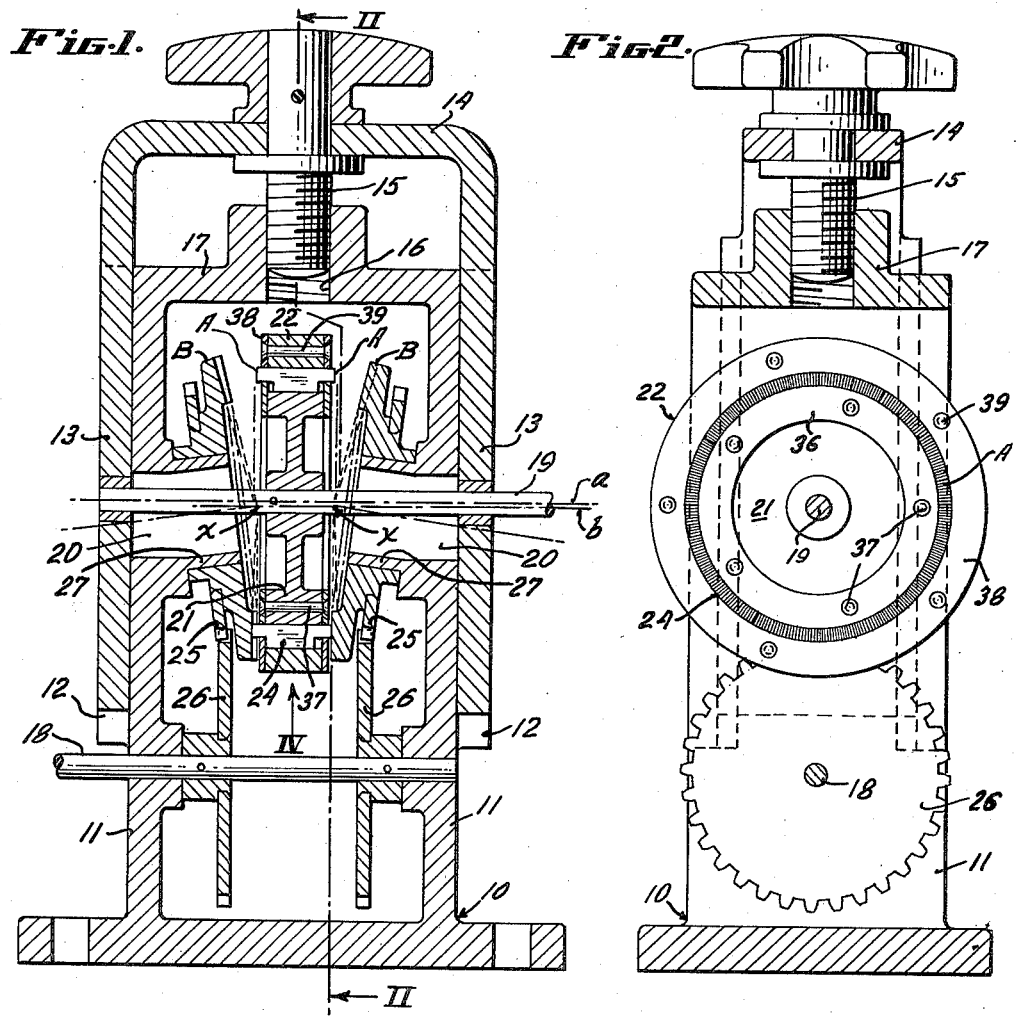
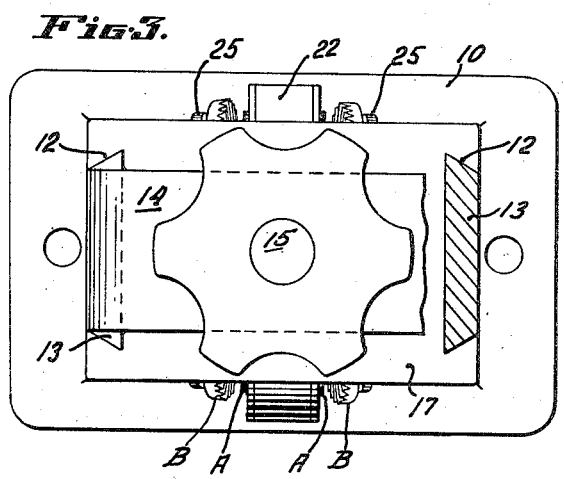
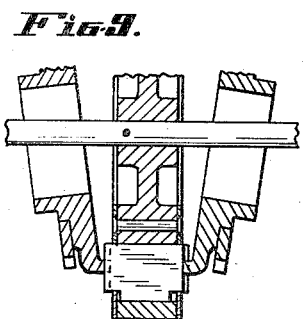
INVENTOR.
Paul Renfrew
BY Oscar A. Mellin
ATTORNEY.

Aug. 12, 1941.   P. RENFREW   2,252,034
VARIABLE RATIO TRANSMISSION MECHANISM
Filed Sept. 20, 1939   2 Sheets-Sheet 2
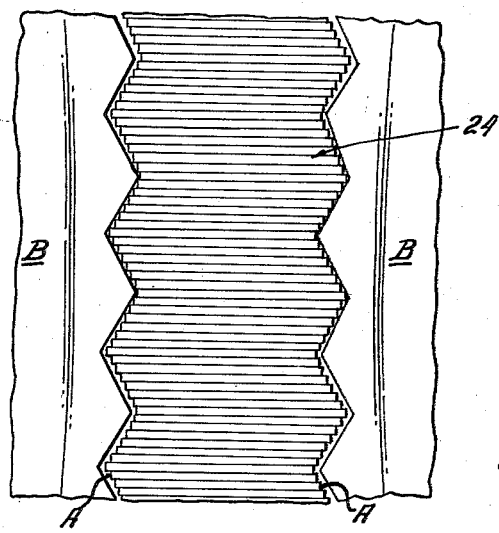
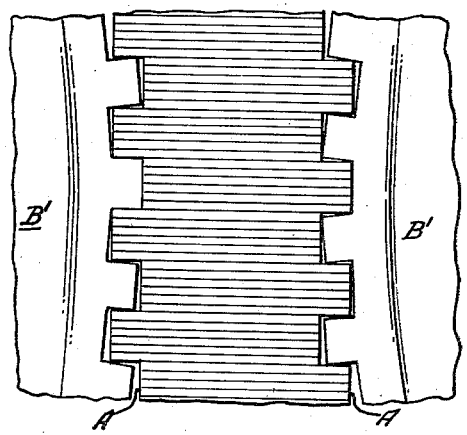
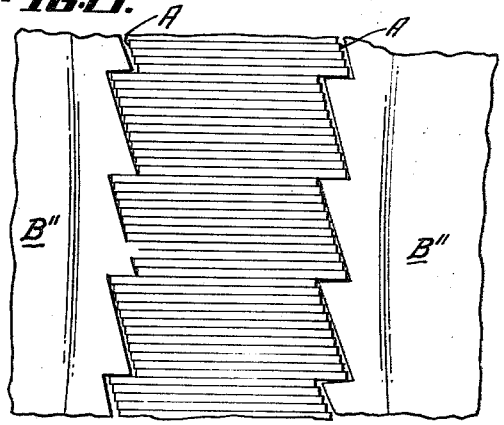
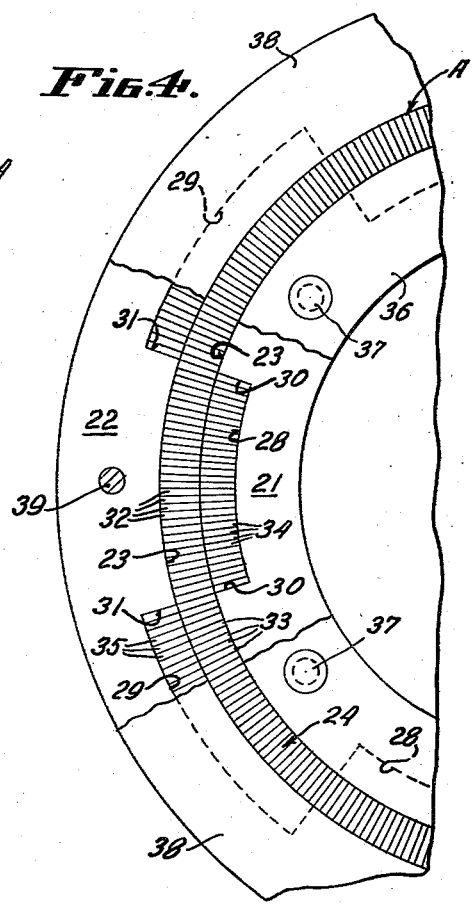
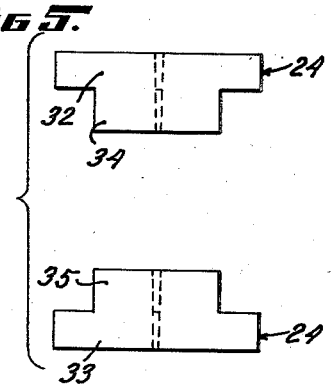
INVENTOR.
Paul Renfrew
BY Oscar A. Mellin
ATTORNEY.

Patented Aug. 12, 1941

2,252,034

UNITED STATES PATENT OFFICE 2,252,034

VARIABLE RATIO TRANSMISSION MECHANISM

Paul Renfrew, Berkeley, Calif., assignor to Ralph N. Brodie Company, Oakland, Calif., a corporation of California Application September 20, 1939, Serial No. 295,779

2 Claims. (Cl. 74—325)

This application is a continuation in part of my pending application entitled "Liquid meter," filed May 11, 1936, and bearing Serial No. 79,132.

The invention relates generally to transmission mechanism and is more particularly directed to variable ratio transmission mechanism of the constant mesh gear type.

It is the principal object of the present invention to provide a constant mesh gear type of transmission mechanism capable of producing a positive transmission of rotary motion between a drive and a driven element and of effecting infinite variations in the ratio of transmission between the minimum and maximum ratio capacities of the mechanism.

One form which the invention may assume is exemplified in the following description and illustrated by way of example in the accompanying drawings, in which:

Fig. 1 is a vertical section through a transmission unit embodying the features of the present invention.

Fig. 2 is a transverse vertical section taken on the line II—II of Fig. 1.

Fig. 3 is a top plan view, partly broken away and in section.

Fig. 4 is an enlarged side elevation of a portion of the crown-wheel, partly broken away to more clearly show the disposition of the tooth forming slidable plates.

Fig. 5 shows the two forms of slidable plates of Fig. 4, their respective tapered cross-sectional contours being indicated in dotted lines.

Fig. 6 is a large scale semi-diagrammatic view of a portion of the crown-gear and its cooperating gears, looking generally in the direction of the arrow IV of Fig. 1.

Figs. 7 and 8 are views similar to Fig. 6 respectively illustrating two modifications of the two gears which cooperatively mesh with the crown-gear.

Fig. 9 is a detail semi-diagrammatic view illustrating the crown-gear plates and the tooth portions of the bevel gears in modified proportions.

While the transmission mechanism herein disclosed may be employed in various situations, it will have a particular utility as a positive constant mesh gear drive in situations wherein it is necessary or desirable to effect infinite variations in the ratio of transmission between the minimum and maximum ratio capacities of the mechanism, being of exceptional value as a calibrating transmission means between measuring mechanism and the counting or indicating mechanism of a meter.

The embodiment illustrated in the drawings includes a stationary frame 10 providing relatively spaced parallel end walls 11 having formed in their respective outer surfaces vertically disposed companion dovetail slideways 12 slidably receiving the opposed depending limbs 13 of a clevis frame 14. An adjusting screw 15 is journaled in the top wall of the clevis frame 14 and is restrained against axial movement therein, its lower screw-threaded end engaging in a screw-threaded bore 16 formed in the top wall 17 which connects the two end walls 11 of the frame 10. It will be evident that, by rotation of the adjusting screw 15, relative vertical movement between the frame 10 and the clevis frame 14 may be effected.

Journaled in the end walls 11 of the frame 10 is a horizontal shaft 18 and journaled in the opposed depending limbs 13 of the clevis frame 14 is a horizontal shaft 19 parallel to the shaft 18. Either of these parallel shafts may be the drive shaft and the other the driven shaft. However, for the purpose of this description, the shaft 18 will be referred to as the driving shaft and the shaft 19 will be termed the driven shaft.

As shown in Fig. 1, the shaft 19 extends through aligned openings 20 in the end walls 11 of the stationary frame 10 and these openings are of sufficient size to provide the necessary clearance for said shaft as it is vertically adjusted with the clevis frame 14 in which it is journaled.

Mounted on the shaft 19, midway between the end walls 11, is a crown-wheel which comprises a hub portion 21 fixed on said shaft and a separate rim portion 22 spaced from said hub portion to provide a continuous concentric intermediate space 23 containing a continuous concentric series of relatively thin radial driving plates, generally designated by the reference numeral 24. These plates are longitudinally disposed in said space in contacting juxtaposition so as to be independently and longitudinally slidable in a shuttlewise manner.

It will be noted that the opposite ends of the plates 24 extend somewhat beyond the opposite sides of the crown-wheel, whereby the continuous concentric series of these plates provide opposed crown-gears A, A, whose gear teeth are perpendicular to the axis of the crown-wheel, as the term "crown-gear" connotes.

A more detailed description of the construction of this crown-wheel will later be given, it being thought desirable, for the time being, to first describe the other elements of the complete mechanism.

With particular reference to Fig. 1 of the drawings, it will be noted that the similar mechanisms on opposite sides of the crown-wheel comprise duplicate acute bevel gears B, B each having fixed thereto a gear 25, the respective gears 25 being in constant mesh with companion gears 26 fixed on and driven by the drive shaft 18. This arrangement insures unitary rotation of both of the bevel gears. These bevel gears face the adjacent sides of the crown-wheel and are journaled on opposed tubular bosses 27 which project inwardly from the respective end walls 11 and surround the openings 20 previously referred to.

It will be observed that the journal bosses 27 are somewhat tilted inwardly and upwardly in a vertical plane intersecting the axis of the shaft 19 so as to oppositely angle the gears B, B to a like degree whereby to insure constant intermeshing of said gears with the adjacent crown-gears A, A only on one side of the crown-wheel axis, with the points of deepest intermesh in the vertical plane intersecting not only the crown-wheel axis but also the axes of both bevel gears. This angling of the bevel gears is such that, at the point of deepest intermesh, the fully meshed teeth of both bevel gears will be substantially parallel to each other and to the crown-gear teeth with which they are meshed.

With this arrangement the apexes $x$ of the imaginary development cones of the two bevel gears will be in horizontal alignment, as indicated by the center line $b$, which center line will be in parallelism with the crown-wheel axis designated by the center line $a$.

The teeth of the bevel gears B, B may be of any desired shape capable of insuring a proper functioning of the mechanism, one form of tooth shape being illustrated in Figs. 3 and 6. In any event it is necessary that the teeth of one of the bevel gears B align with the tooth spaces of the opposed bevel gear so that, as the teeth of one of said gears engage the plates 24 at one end thereof and translate said plates in conformity with the tooth shape, the opposite ends of the translated plates will enter the tooth spaces of the opposed bevel gear. This is clearly illustrated in Fig. 6 of the drawings from which it will be understood that the bevel gears as they intermesh with the crown-gears, actuate the plates in a manner to form the crown-gear teeth and tooth spaces.

With particular reference to Figs. 4 and 5, it will be seen that the outer periphery of the hub portion 21 of the crown-wheel is provided with circularly spaced longitudinal grooves 28 facing the intermediate concentric space 23, while the inner periphery of the separate rim portion 22 thereof is provided with similar circularly spaced longitudinal grooves 29 facing said intermediate space and circularly staggered in relation to the grooves 28. The grooves 28 provide opposed driving abutments 30 on the hub portion 21 on one side of the intermediate concentric space 23 and the grooves 29 provide opposed driving abutments 31 on the rim portion 22 of the crown-wheel.

As shown in Fig. 5, the several radial plates 24, which form the crown-gears A, A, are of the same shape, in plan. However, some of them have a cross-sectional contour reversely tapered in relation to the others (as indicated by dotted lines in said Fig. 5) so that all of said plates may be properly nested in the crown-wheel as shown in Fig. 4. To clearly distinguish the two plate forms, additional reference characters 32 and 33 will be applied thereto in Figs. 4 and 5. As shown in Fig. 5, each plate 32 is provided with a longitudinal stop wing 34 which is somewhat shorter than the overall length of said plate and is disposed at the thin side of the blade taper. Each plate 33 has a similar stop wing 35 which is disposed at the thick side of the blade taper. Thus there are provided two forms of blades of the same shape but reversely tapered in cross-section with one form having a stop wing 34 along its thin edge and the other form having a similar stop wing 35 along its thick edge.

These blades are disposed in the concentric intermediate space 23 of the crown-wheel in groups, as shown in Fig. 4; that is, groups of the plates 32 will be disposed in the intermediate space 23 of the crown-wheel with their stop wings 34 disposed in the respective grooves 28 between the opposed driving abutments 30 of the hub portion 21 of said wheel, while intermediate groups of the plates will be disposed in said space with their stop wings 35 disposed in the respective grooves 29 between the opposed driving abutments 31 of the rim portion 22 of said wheel, there being sufficient numbers of the plates in each group to completely fill said grooves while at the same time leaving sufficient clearance to permit free longitudinal sliding thereof.

With the several plates thus positioned, the groups of plates 32 are retained in the intermediate space 23 by opposed inner rings 36 which engage the opposite side faces of the hub portion 21 of the crown-wheel to overlap the stop wings 34 of said plates and are secured to said hub portion by rivets 37, while the groups of plates 33 are similarly retained in said space by opposed outer rings 38 which overlap the stop wings 35 of the plates 33 and are secured to the opposite faces of the crown-wheel by rivets 39.

As shown in Fig. 1, the stop wings of the several plates are somewhat shorter than the width of the hub and rim portions of the crown-wheel so as to permit the necessary longitudinal sliding movements of said plates.

With this construction the entire circular series of driving plates is maintained in the crown-wheel in position to form the opposed crown-gears and in a manner permitting their longitudinal translation to form the teeth of said crown-gears. The separate hub and rim construction of the crown-wheel, with the elimination of spokes therebetween, permits the use of blades of uniform shape which may be stamped by a single set of stamping dies, even though the slight taper of blades 32 is reverse to the slight taper of the blades 33.

In Figs. 6, 7 and 8 there are illustrated three different forms of bevel gears which may be employed, the gears B having V-shaped teeth, the gears B', in Fig. 7, having square teeth, while the gears B'' of Fig. 8 have teeth of ratchet form.

In the operation of the described transmission mechanism, the opposed bevel gears B, B will, through the gears 25 and 26, be rotated in unison. These bevel gears, as they intermesh with the opposed crown-gears A, A, formed by the circular series of driving plates 24, will translate said plates in a shuttlewise manner in conformity with the tooth and tooth space shapes of the bevel gear teeth and tooth spaces to form the crown-gear teeth and tooth spaces. In this manner the drive between the bevel gears and the crown-wheel is effected.

To effect a change in the driving ratio, the clevis frame 14, carrying with it the crown-wheel and its shaft 19, will be raised or lowered in relation to the stationary frame 10 and the bevel gears B, B, carried thereby, by means of a proper rotation of the adjusting screw 15, such adjustment serving to vary the point of intermesh of the crown-gears A, A, with said bevel gears B, B in relation to the cone centers $x$ of said bevel gears; that is, such adjustment will cause the crown-gears to intermesh on a greater or less pitch circle of the respective bevel gears.

From Fig. 1 it will be evident that when the adjustment of the crown-wheel and its crown-gears, in relation to the associated bevel gears, is such that the axis $a$ of the crown-wheel coincides with the line $b$ which intersects the cone centers $x$, $x$ of the bevel gears, the pitch circle of intermesh will be uniform both with respect to the line $b$ and the axis $a$ of the crown-gears and the mechanism will produce a one to one driving ratio to rotate the crown-wheel at the same speed as that of the bevel gears. With this adjustment there will be formed in the crown-gears A, A, due to the longitudinal actuation of the crown-gear plates by said bevel gears, the same number of teeth as there are in each of the bevel gears. For example, if each bevel gear has forty teeth, said one to one ratio intermesh will actuate the crown-gear plates to form forty teeth in each of the opposed crown-gears.

It will further be understood that if, as shown in Fig. 1, the crown-wheel is elevated to bring its axis $a$ above the line $b$ of the cone centers $x$, $x$, the intermesh will occur on lesser diameter pitch circles of the respective bevel gears with the result that the crown-wheel and its shaft 19 will be driven at a lesser speed than that of said bevel gears, thus effecting a reduction in the ratio of the transmitted drive, and reversely, that if the crown-wheel be lowered to bring the axis $a$ below said line $b$, the intermesh will occur on greater diameter pitch circles of said bevel gears with the result that said crown-wheel and its shaft will be driven at a greater speed than that of said bevel gears, thus effecting an increase in the ratio of the transmitted drive.

Obviously, since the bevel gears have a fixed number of teeth and since the crown-gears may be adjusted to intermesh therewith at different distances from the bevel gear axes, it follows that the number of teeth formed in the crown-gears by their intermeshing engagement with said bevel gears varies as such distance of intermesh varies.

Continuing the previous example in which it was considered that the bevel gears have forty teeth, it will be evident that an adjustment could be made so that the forty tooth bevel gears would actuate the crown-gear plates to form one more tooth, or forty-one teeth, on the crown-gears, or an adjustment could be made so that said bevel gears would actuate said plates to form one less tooth, or thirty-nine teeth, on the crown-gears. Also it should be evident that, since the changes may be of infinite progression, as distinguished from a step-by-step progression or a tooth-by-tooth progression, there will be an infinite number of possible changes between such one-tooth increase or decrease which will involve only a fractional part of a tooth pitch insofar as the number of teeth formed on the crown-gears is concerned. For example, an adjustment may be made whereby the forty teeth of the bevel gears, engaged by the crown-gears nearer the axes of said bevel gears, will, during one revolution of the crown-wheel, actuate the crown-gear plates to form forty and a fraction teeth, or, another adjustment may be made wherein the crown-gears engage the bevel gears at a greater distance from their axes, in which case the crown-gear plates will be actuated to form only thirty-nine and a fraction teeth in the crown-gears during one revolution thereof.

In such instances there will be a more or less continuous shuttlewise sliding of the crown-gear plates during the intermeshing thereof with the bevel gears, to rearrange said plates during each revolution of the crown-wheel.

In one embodiment of the present invention, similar to that herein illustrated and described, I have attained driving ratios infinitely variable between seven to eight and one to one and between one to one and nine to eight.

By those skilled in this art it will be obvious that the range of ratio variations attainable in a mechanism of the character herein disclosed is limited only by the minimum and maximum ratio capacities of the mechanism and that between such limits the mechanism will provide an infinite number of different driving ratios.

In Fig. 9 there is illustrated a modified construction in which the tooth faces of the beveled gears are relatively short and the crown-gear plates are relatively wide. This construction will produce the same results as that previously described.

From the foregoing it will be evident that a transmission mechanism embodying the features of the present invention will have an exceptional utility in various situations requiring a constant mesh gear transmission capable of providing a driving ratio which is infinitely variable at will between the minimum and maximum ratio capacities of the mechanism, and while the herein disclosed embodiment is fully capable of fulfilling the object primarily stated, it is to be understood that various changes may be made in its construction by those skilled in the art without departing from the spirit of the invention as defined in the appended claims.

Having thus described my invention, what I claim and desire to secure by Letters Patent is:

1. In a transmission mechanism of the nature disclosed, a crown-wheel comprising a hub portion having circularly spaced longitudinal grooves formed in its outer periphery, a separate rim portion surrounding and spaced from said hub portion to provide an intermediate concentric space and having circularly spaced longitudinal grooves formed in its inner periphery, said rim grooves being circularly staggered relative to said hub grooves, a continuous series of independent longitudinally slidable driving plates radially disposed in said space and projecting therefrom to form a crown-gear, each of said plates having a stop wing along one longitudinal edge thereof and the several plates being arranged in adjacent groups with plates of the alternate groups having their stop wings disposed in the respective hub grooves and the plates of the intermediate groups having their stop wings disposed in the respective rim grooves, separate means on said hub and rim portions disposed for engagement by said stop wings to limit the sliding movements of the respective driving plates, a bevel gear journaled adjacent said crown-wheel in an angled position for constant intermesh with said crown-gear only on one side of its axis to actuate said crown-gear driving plates in conformity with the tooth and tooth space shapes of the bevel gear, and means for causing relative movement between said crown-wheel and said bevel gear to vary the pitch of such intermesh whereby to vary the driving ratio produced by said gears.

2. A crown-wheel comprising a hub portion having circularly spaced longitudinal grooves formed in its outer periphery, a separate rim portion surrounding and spaced from said hub portion to provide an intermediate concentric space and having circularly spaced longitudinal grooves formed in its inner periphery, said rim grooves being circularly staggered relative to said hub grooves, a continuous series of independent longitudinally slidable driving plates radially disposed in said space and projecting therefrom to form a crown-gear, each of said plates having a stop wing along one longitudinal edge thereof and the several plates being arranged in adjacent groups with plates of the alternate groups having their stop wings disposed in the respective hub grooves and the plates of the intermediate groups having their stop wings disposed in the respective rim grooves, and separate means on said hub and rim portions disposed for engagement by said stop wings to limit the sliding movements of the respective driving plates.

PAUL RENFREW.